United States Patent

Livnat

[11] Patent Number: 5,984,473
[45] Date of Patent: Nov. 16, 1999

[54] METHOD AND SYSTEM FOR ADJUSTING PROGRESSIVE LENSES FOR A PATIENT'S SPECTACLES

[75] Inventor: Ami Livnat, Arad, Israel

[73] Assignee: Rotlex Ltd., D.N. Arava, Israel

[21] Appl. No.: 08/887,327

[22] Filed: Jul. 2, 1997

[51] Int. Cl.⁶ ...................................................... G02C 7/02
[52] U.S. Cl. .......................... 351/177; 351/169; 351/178; 351/204
[58] Field of Search ..................................... 351/169, 177, 351/204, 178, 168, 170, 171, 172

[56] References Cited

U.S. PATENT DOCUMENTS

| | | |
|---|---|---|
| 3,454,331 | 7/1969 | Maritenaz et al. . |
| 4,167,067 | 9/1979 | Guiset . |
| 4,368,958 | 1/1983 | Buget ....................................... 351/204 |
| 5,640,775 | 6/1997 | Marshall . |
| 5,691,799 | 11/1997 | Ramachandran ........................ 351/204 |

FOREIGN PATENT DOCUMENTS

| | | |
|---|---|---|
| 2384232 | 10/1978 | France . |
| 2672792 | 8/1992 | France . |

Primary Examiner—Scott J. Sugarman
Attorney, Agent, or Firm—Browdy and Neimark

[57] ABSTRACT

A method and a system of adjusting a progressive lens relative to the frame of a patient's spectacles. The lens has power and distortions distributions and far and near vision zones and is selected inter alia in accordance with respective prescribed first and second values of the optical power required for the patient's eye at its reading and distance vision. A direction of a line of sight of the patient's eye at the reading vision, relative to the frame of the spectacles, is determined. The lens is positioned and oriented relative to the frame so as to ensure that the line of sight passes through the near vision zone of the progressive lens.

40 Claims, 6 Drawing Sheets

FIG. 1A
FIG. 1B
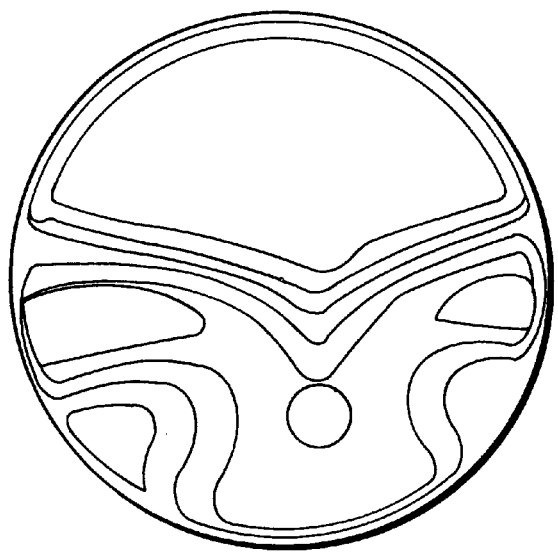
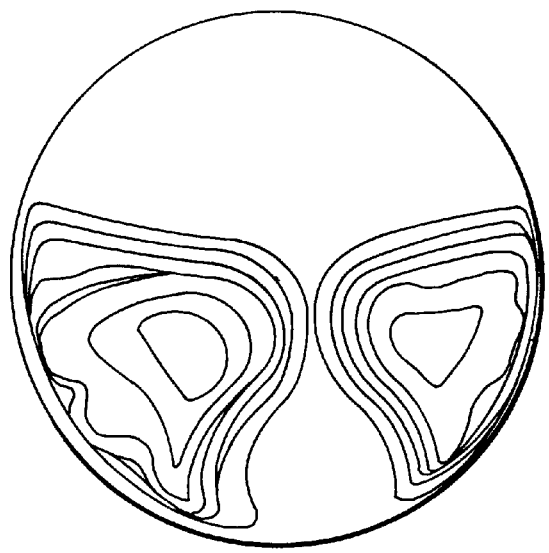
FIG. 2
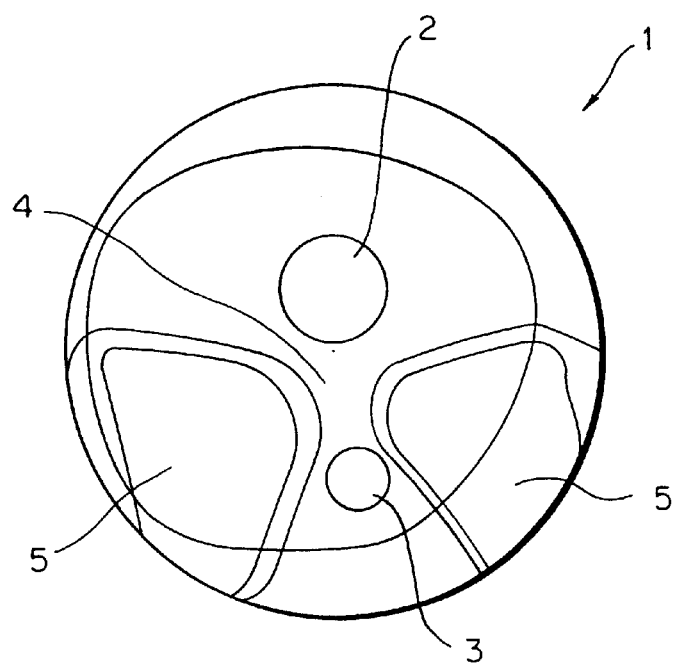

METHOD AND SYSTEM FOR ADJUSTING PROGRESSIVE LENSES FOR A PATIENT'S SPECTACLES

FIELD OF THE INVENTION

The present invention relates to a method and a system for adjusting a pair of progressive lenses for mounting in the frame of a patient's spectacles.

BACKGROUND OF THE INVENTION

Progressive, or multifocal, lenses are well known and widely used especially by patients suffering from weak eyesight in both 'reading' and 'distance' visions, such as, for example, presbyopia. There is a certain number of standard progressive lenses produced by various manufacturers. As known in the, art, the main features characterizing each standard progressive lens are its optical power and distortions distribution within the lens, as clearly illustrated in FIGS. 1a and 1b, respectively. There is practically no way of eliminating or substantially reducing the distortions, because the progressive lens is typically formed with a certain 'local cylinder' thereof.

Referring to FIG. 2, there is illustrated a final map of a standard progressive lens, generally designated 1, manufactured in accordance with prescribed parameters of optical powers required for a patient's 'distance' and 'reading' visions and cylinder parameters, if any. The lens 1 is formed with four main zones 2 to 5. The zone 2 is a far vision zone corresponding to the patient's 'distance' vision, the zone 3 is a near vision zone corresponding to the patient's 'reading' vision, the zone 4 is a zone of continuous focus, and the zone 5 is the zone of concentrated optical distortions, so-called 'transition' zone. All the above features of the progressive lens are well known per se and, therefore, do not need to be described in more detail. Additionally, it is important to note that each standard lens is characterized by its 'addition' value defined by a difference in powers in the far and near visions. As shown, the far vision zone 2 is surrounded by a free of distortions region which almost completely occupies the upper semicircular region of the lens. The near vision zone 3 is always spaced a certain preset distance from a major reference point (MRP) of the lens which is common for the lenses of a specific standard kind, wherein the MRP is defined as the point with zero prism and it approximately coincides with the geometrical center of the lens. Generally, the location of a center of the near vision zone 3 is mostly considered to be 16 mm below the MRP of the lens and 2 mm therefrom towards the center of the spectacles. This location is not agreed by all manufactures and there are standard lenses with different locations of reading zones relative to the MRP. As clearly shown in FIG. 2, an undistorted region around the near vision zone 3 is extremely narrow, which is typical for all progressive lenses.

The whole process of providing a patient with progressive lens spectacles generally includes the following stages:

1) determining for each eye of the patient first and second values of the optical power required for the patient's eyesight in 'reading' vision and 'distance' vision regions;
2) selecting for each eye a lens of a suitable standard kind according to its 'addition' value, and processing an inner side of the lens according to the prescribed first and second values of the optical power; and
3) cutting and mounting the lens in the frame of the spectacles, previously chosen by the patient, in such a position that an inter pupillary distance of the patient for 'distance' vision matches a distance between the far vision zones 2 of the pair of progressive lenses.

The first stage is conventionally carried out by specialists, namely by a physician or a skilled optometrist. The second stage is carried out by a sophisticated producer. The third stage, which is not less critical for succeeding in adjusting the spectacles, is carried out by an optician whose capability suffers from certain serious limitations associated with the conventional approach and equipment he has at his disposal, Each standard lens is usually available with markings specifically indicating the locations of the zones 2 and 3. Thus, as illustrated in FIG. 3, the optician determines an inter pupillary distance for the patient's 'distance' vision and inputs the respective data, as well as the spectacles' frame parameters, i.e. its dimensions, into a so-called 'edger' which is typically used for circumferential cutting of a lens so as to design a contour thereof suiting that of the frame. Upon detecting that the pupil location for the 'distance' vision falls within the zone 2 marked on the lens, the optician operates the edger for cutting the lens.

It is often the case that such a complicated process of adjusting progressive lenses for a patients spectacles gives unsatisfactory results, and it is not an exaggeration to say that most patients feel uncomfortable with their new spectacles for a long time until the eyes 'get accustomed' to the lenses and for considerable number of patients it never happens. One of the reasons for this is that the adjustment is, actually, solely based on 'distance' vision parameters of the patient's eyesight, while that of the 'reading' vision are completely ignored. It should be specifically noted that an inter pupillary distance for the reading vision has never been measured in the conventional approach for adjusting the progressive lenses for the patient's spectacles, since it was assumed that the above indicated relative location of the near vision zone 3 is suitable for all patients. However, the inter pupillary distance of the specific patient in the 'reading' vision may not match the near field zone location of the standard lens. In such case there is an expectation that the patient will adapt himself to the lenses, but in many cases it never happens.

SUMMARY OF THE INVENTION

It is thus a major object of the present invention to overcome the above listed and other disadvantages of the conventional approach and provide a method and a system for adapting a prescribed progressive lens to a patient's eye by adjusting the lens for mounting thereof into the frame of the patient's spectacles.

It is a further object of the present invention that the method is capable of selecting a kind of progressive lens to be adjusted for mounting thereof into the frame.

It is a still further object of the present invention that the system is capable of determining the patient's natural pupils' locations for the 'reading' vision relative to the frame of the spectacles.

In accordance with one aspect of the invention, there is provided a method of adjusting a progressive lens relative to the frame of a patient's spectacles, the lens having power and distortions distributions and far and near vision zones, and being selected inter alia in accordance with respective prescribed first and second values of the optical power required for the patient's eye at its reading and distance vision, the method comprising the steps of:

(a) determination of the direction of a line of sight of the patient's eve at said reading vision, relative to the frame of the spectacles; and (b) positioning and orientation said progressive lens relative to said frame so as to ensure that said line of sight passes through said near vision zone of said progressive lens.

The method preferably also comprises the determination of the distributions of the optical power and of the optical distortions of the progressive lens. The positioning and orienting the progressive lens is such as to ensure that the line of sight passes therethrough at a location thereon in which the optical power of the progressive lens is substantially of the second value and the optical distortions are minimal.

The method may further comprise determination of the direction of a line of sight of the patient's eye at the distance vision, relative to the frame of the spectacles, the positioning and orienting of the progressive lens being such as to ensure that the line of sight of the patient's eye at his distance vision passes through the far vision zone of said progressive lens. The distributions of the optical power and of the optical distortions of the progressive lens may also be determined and the positioning and orienting the progressive lens be such as to ensure that the line of sight passes through the lens at a location thereon in which the optical power of the progressive lens is substantially of the first value and the optical distortions are minimal.

The determination of the direction of the line of sight of the patient at the reading vision may be performed by means of the measurement of the pupils' location of the patient relative to the frame for the reading vision. This measurement of the pupils' location of the patient for the reading vision is preferably performed at a natural reading position of the patient. The determination of the distributions may comprise either processing an image of the lens in a so-called 'mapping' system, or analyzing a reference data representative of a plurality of maps of standard lenses manufactured by various producers. Preferably the positioning and orienting of the progressive lens relative to the frame are performed on an edger device in which there are provided linear and rotational movements of the lens.

According to another aspect of the present invention there is provided a method of adjusting a progressive lens relative to the frame of a patient's spectacles, the lens having distributions of the optical power and optical distortions therein and being selected inter alia in accordance with respective prescribed first and second values of the optical power required for the patient's eye at its trading and distance visions, the method comprising the steps of:

determination of said distributions of optical power and optical distortions in said progressive lens;

determination of the direction of a line of sight of the patient's eye for at least one of said visions, relative to the frame of the spectacles; and positioning and orienting said progressive lens relative to said frame so as to ensure that said line of sight passes through the respective vision zone of the progressive lens at a location thereon in which the optical power of the progressive lens is substantially of said respective value and in which said optical distortions are minimal.

According to still another aspect of the present invention there is provided a system for adjusting a progressive lens relative to a frame of a patient's spectacles, the lens having far and near vision zones and distributions of the optical power and optical distortions in the lens, and chosen in accordance with respective prescribed first and second values of the optical power required for the patients eye at its reading and distance vision, the system comprising:

(i) a device for the determination of the direction of a line of sight of the patient's eye it said reading vision, relative to the frame of the spectacles, and (ii) a device for the positioning and the orienting of said progressive lens relative to said frame so as to ensure that said line of sight passes through said near vision zone of said progressive lens.

The device may also comprise means for determination of the distributions of the optical power and of the optical distortions of the progressive lens. The device for the positioning and the orienting of the progressive lens relative to the frame operates such as to ensure that the line of sight passes through the lens at a location thereof in which the optical power of the progressive lens is substantially of the second value and in which the optical distortions are minimal.

Preferably, the device for the determination of the direction of the line of sight of the patient at the reading vision is capable of the measurement of the pupils location of the patient for the reading vision, in particular at a natural reading position of the patient. The system preferably also comprises a mapping device for the determination of the distributions of the optical power and of the optical distortions of the progressive lens.

The system may also comprise a storing means for storing a reference data representative of a plurality of maps of standard lenses manufactured by various producers. The system is preferably in the form of an edger device enabling linear and rotational movements of the progressive lens. The system may also comprise a processor unit which may be coupled to the edger.

Further provided according to the invention is a system for adjusting a progressive lens relative to a frame of a patient's spectacles, the lens having distributions of the optical power and optical distortions therein and chosen in accordance with respective prescribed first and second values of the optical power required for the patients eye at its reading and distance vision, the system comprising:

a mapping device for the determination of the distributions of said optical power and of said optical distortions of said progressive lens; a means for determination of the direction of a line of sight of the patient's eye for at least one of said visions, relative to the frame of the spectacles; and a device for the positioning and the orienting of said progressive lens relative to said frame so as to ensure that said line of sight passes through the progressive lens at a location thereon in which the optical power is substantially of the respective value and in which the distortions are minimal.

BRIEF DESCRIPTION OF THE DRAWINGS

In order to understand the invention and to see how the same may be carried out in practice, a preferred embodiment will now be described, by way of example only, with reference to the accompanying drawings, in which:

FIGS. 1a and 1b are schematic illustrations of two main characteristics of a progressive lens;

FIG. 2 schematically illustrates the main map typically characterizing a progressive lens manufacturer according to prescribed values of a patient's 'distance' and 'reading' vision powers;

DETAILED DESCRIPTION OF THE PREFERRED EMBODIMENTS

Figure 3:
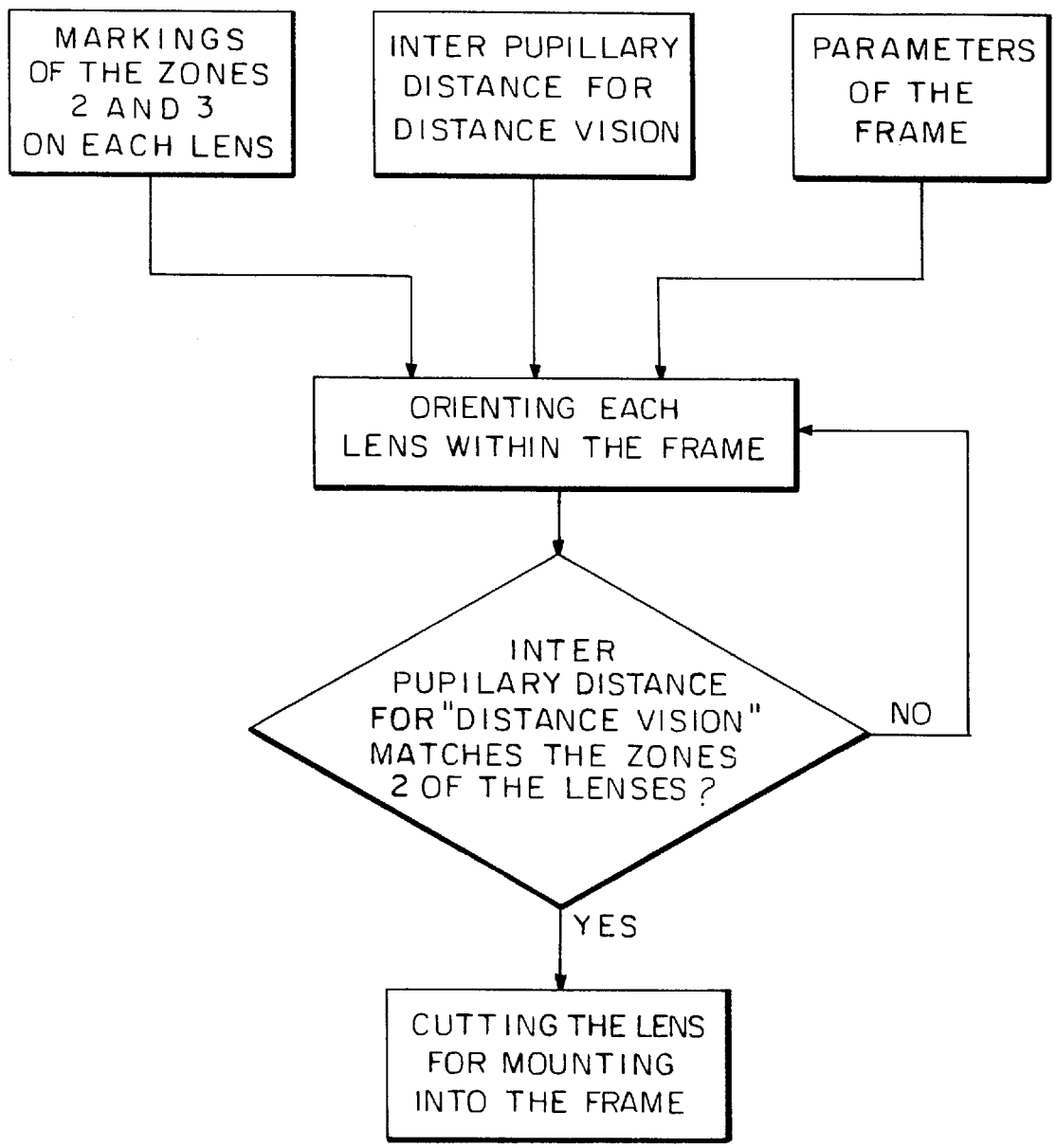
FIG. 3 is a flow diagram illustrating the principles of conventional technique for adjusting a pair of prescribed progressive lenses for mounting into the frame of a patient's spectacles.

FIGS. 1a, 1b and 2 illustrate the main characteristics of a conventional progressive lens of the kind to which the present invention refers. FIG. 3 illustrates the main steps of a conventional process of adjusting a lens such as shown in FIG. 2 for mounting in the frame of a patient's spectacles.

Figure 4:
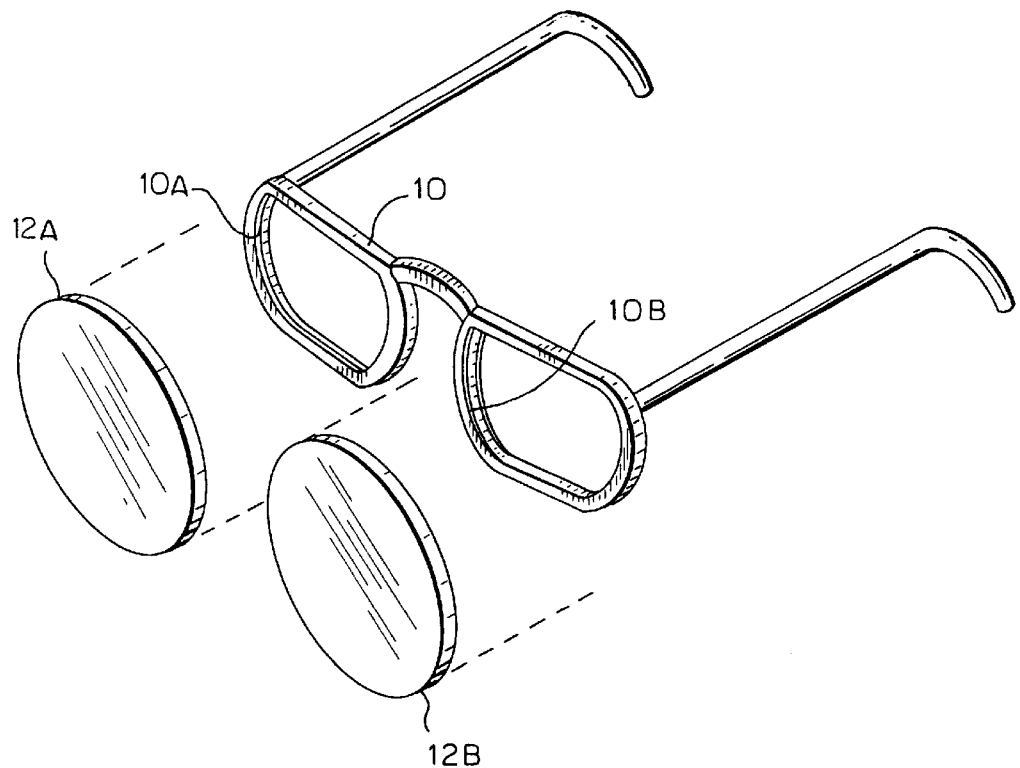
FIG. 4 is a pictorial illustration of the frame of a patient's spectacles and a pair of lenses to be mounted in the frame.

Referring to FIG. 4 there is illustrated a frame 10 and a pair of progressive lenses 12a and 12b to be mounted in the frame 10 so as to completely form a patient's spectacles. The frame 10 defines a pair of spaced inner contours 10a and 10b. The lenses 12a and 12b are manufactured in a conventional manner and are chosen in accordance with an 'addition' defined by prescribed values of optical power for the patient's 'distance' and 'reading' vision and cylinder parameters (if any). As shown, the lenses 12a and 12b are of substantially circular contours which should be cut so as to suit the contours 10a and 10b, respectively, of the frame 10.

Figure 5:
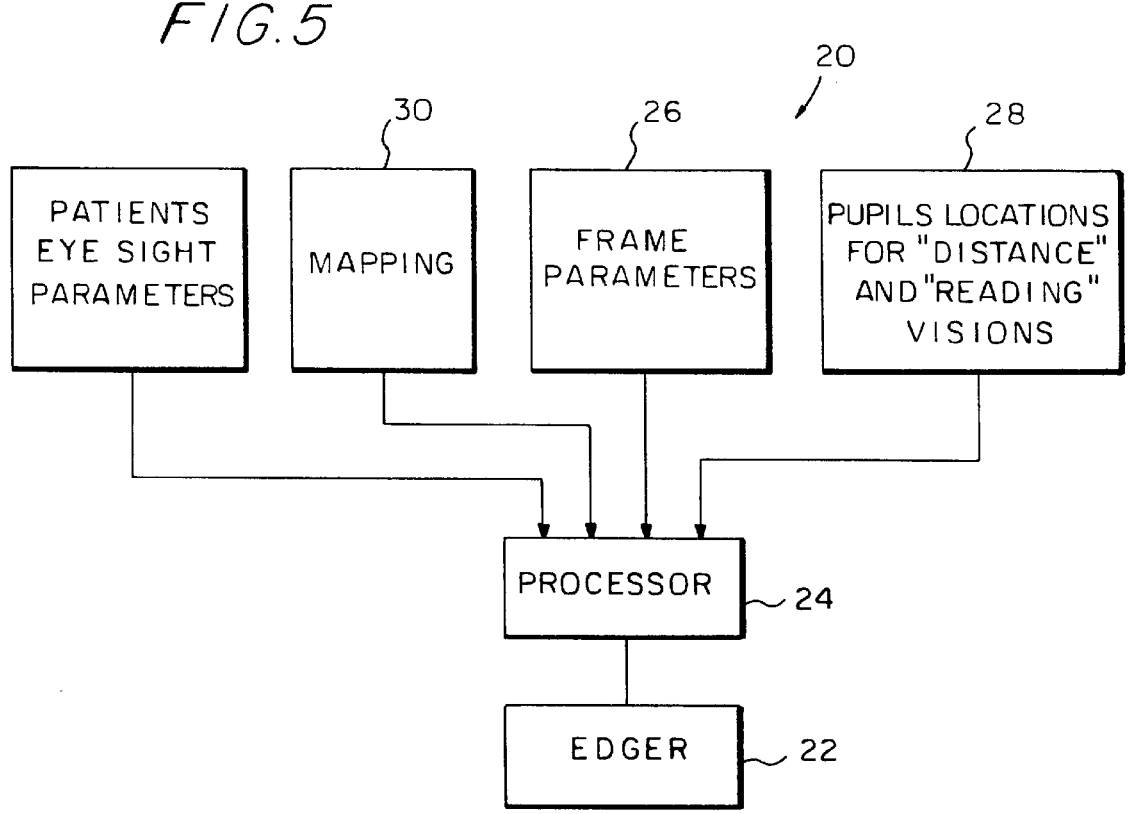
FIG. 5 is a block diagram showing the main components of a system according to the invention.

Turning now to FIG. 5, there is shown a system, generally designated 20, for adjusting the progressive lenses 12a and 12b for mounting in the frame 10. The system 20 comprises an edger 22 used for positioning and orienting each of the lenses 12a and 12b relative to the respective contours 10a and 10b and for circumferential cutting of the lenses. The edger 22 is a known device and its construction and operation do not form parts of the present invention. The system 20 further comprises a processor 24 coupled to the edger 22 for operating the latter.

The following information is input into the processor 24:

frame parameters;

pupils' locations' parameters for 'distance' and 'reading' vision; and lens parameters represented by lens maps such as shown in FIG. 2.

The frame parametes may be obtained by a measuring device 26, Alternatively, data representative of different frames parameters may be prestored in the processor 24. It is also possible, although not specifically shown, that the device 26 be a constructional part of the edger 22.

The pupils' locations for 'distance' and 'reading' visions are obtained by means of a measuring device 28 which determines pupils' locations of each patient's eye relative to the respective contour 10a or 10b of the frame 10 for both the 'distance' and 'reading' vision. The preferred embodiment of the construction and operation of the device 28 will be described further below with reference to FIGS. 8 and 9.

The lens parameters include power and distortions distribution in the lens and the lens 'addition' corresponding to prescribed values of the optical powers required for the patient's eyes for 'distance' and 'reading' vision, as described above with reference to FIG. 2. These parameters may be determined either by means of an appropriate mapping device 30 coupled to the processor 24 for reproducing a map for each of the lenses 12a and 12b such as, for example, so-called 'Moire Deflectometer' produced by Rotlex Ltd, or from maps or the like data supplied by a manufacturer of the lenses 12a and 12b.

Figure 6:
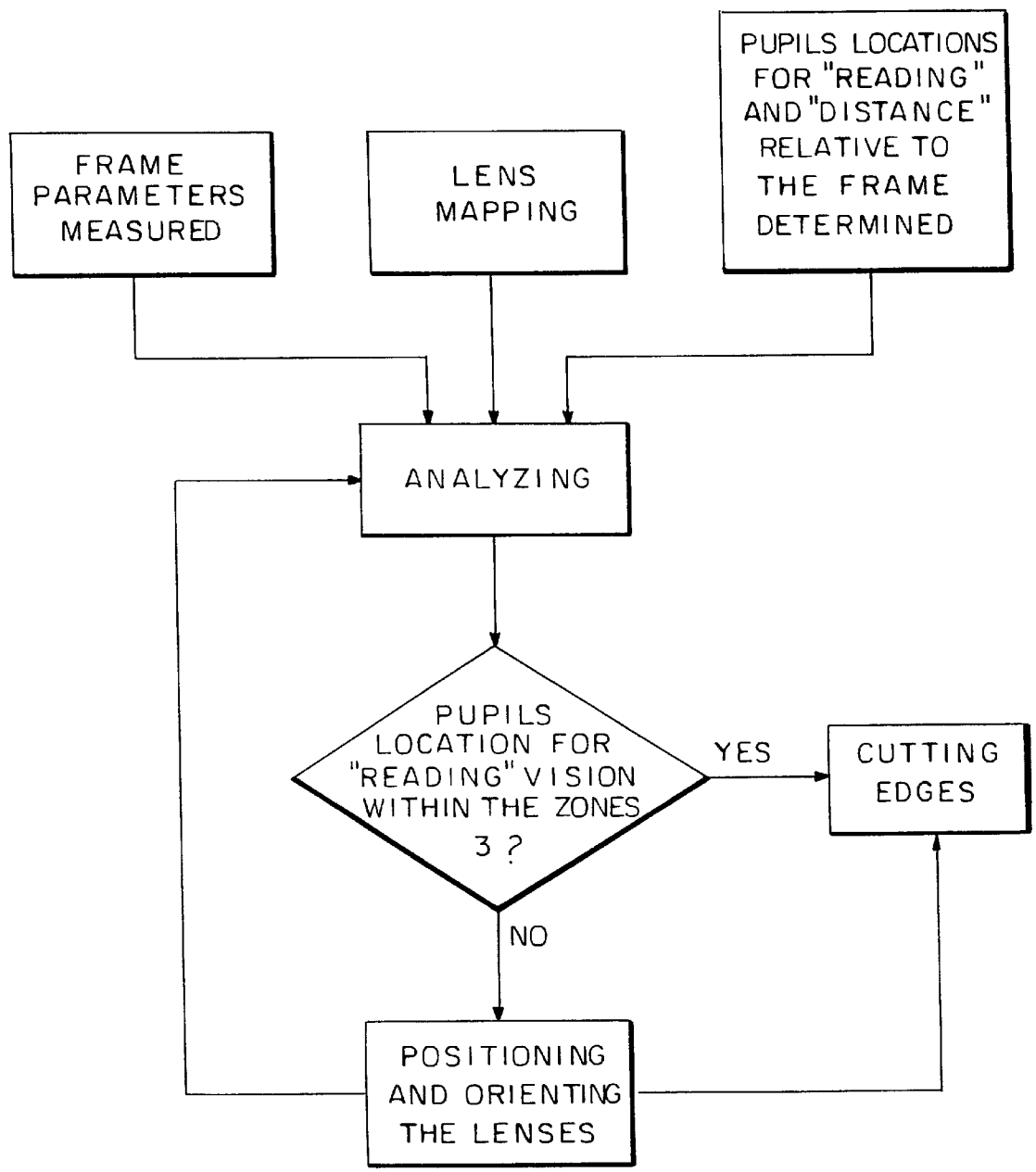
FIG. 6 is a flow diagram illustrating the principles of operation of the system of FIG. 5.

The main principles of operation of the system 20 will now be described with reference to FIG. 6. The optician receives the pair of lenses 12a and 12b from the manufacturer and the frame 10 from the patient. The optician operates the device 30 for determining the above parameters of each of the lenses and the device 26 for determining the frame parameters. Then, the optician operates the device 28 for determining the pupils' locations relative to the frame for 'distance' and 'reading' visions. All the measured data is input into the processor 24 in a conventional manner, for example through a keypad (not shown). The processor 24 is operated by suitable software for analyzing the input data. There is usually no problem to adjust the inter pupillary distance for 'distance' vision so as to match the far vision zones 2 of both the lenses 12a and 12b. Indeed, as clearly seen in FIG. 2, the zone 2 is always surrounded by a free of distortions region. As for the near vision zone 3, upon detecting by the processor 24 that the pupil location does not match the zone 3 of the either lens, the processor generates a decision accordingly for indicating to the optician how to orient the lens 12a or 12b relative to the respective contour 10a or 10b for obtaining the matching.

Figure 7:
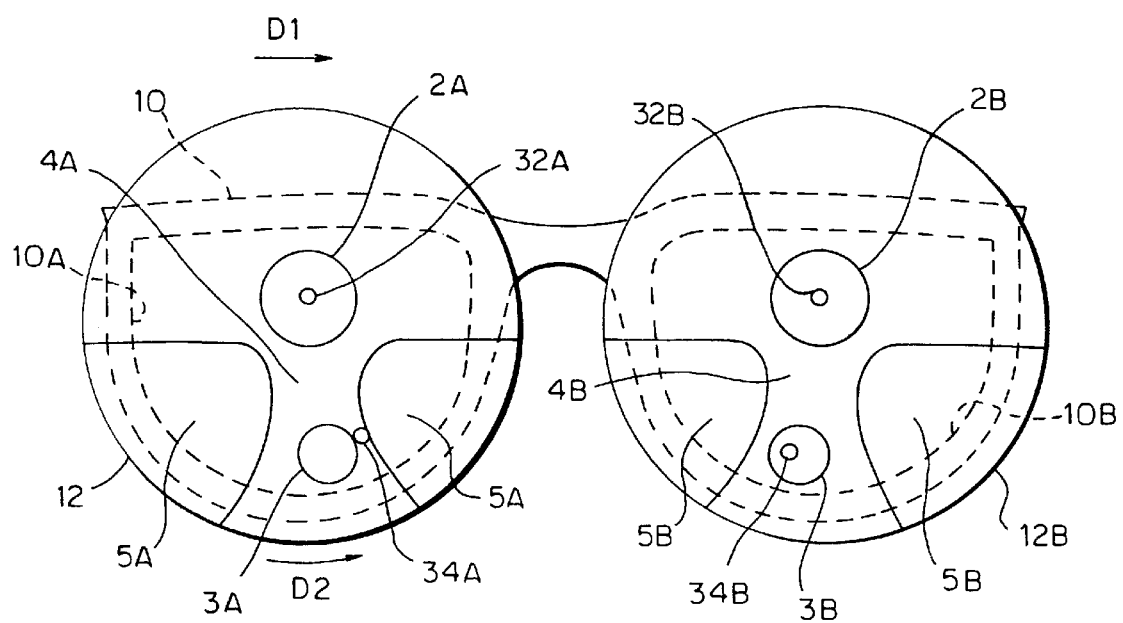
FIG. 7 more specifically illustrates the principles of operation of the system of FIG. 5 for adjusting the lens of FIG. 2 for mounting into the frame of the spectacles.

Reference is now made to FIG. 7 illustrating a process of making the above decision for one example of a possible adjustment. The lenses 12a and 12b are positioned opposite to the frame 10 so as to facilitate understanding regarding the locations of the zones 2a, 3a, 4a, 5a and 2b, 3b, 4b and 5b relative to the contours 10a and 10b, respectively. Small regions 32a and 32b correspond to pupils locations relative to the contours 10a and 10b for 'distance' visions of the patient's eyes. More specifically, lines of sight (not shown) of the patient's eyes intersect frame planes defined by the contours 10a and 10b in the regions 32a and 32b, which will be described in further details below. Similarly, small regions 34a and 34b correspond to pupils' locations relative to the frame for 'reading' vision. As clearly shown, the regions 32b and 34b fall within the zones 2b and 3b and, therefore, the lens 12b satisfies the requirement of patient's left eye. As for the patient's right eye, the pupil location 34a falls on a boundary region between the zone 3a and the transition zone 5a. It is appreciated that the patient would not feel comfortable with such spectacles. However, when observing the whole map of the lens 12a relative to the contour 10a, it becomes clear that either displacement of the lens 12a towards a center of the frame 10, i.e. in a direction $D_1$, or rotation of the lens 12a about an axis thereof in a direction $D_2$, would result in both regions 32a and 34a being in allowed locations. Regarding the rotation, it should be such as to keep a line connecting the zones 2a and 3a within the zone 4a of continuous focus. This case is less effective when the lens is manufactured in accordance with the parameters of a specific cylinder as prescribed by an optometrist. To this end, on the one hand, the manufacturer should consider a possible rotation for predetermining a cylinder axis angle accordingly. On the other hand, the optician should define the rotation so as to be within a tolerance allowed by the cylinder axis.

Alternatively, although not specifically shown, the case may be such that the pupil location for 'reading' vision is displaced from the typical position of the near vision zone 3 of either lens. In such situation the pupil location may, for example, fall within the zone 4 of continuous focus at such a point on the lens where the optical power of the latter is less than that required for a patient for 'reading' vision. The conventional approach for providing the patient's spectacles, as described above, is based on the fact that a lens 'addition' is determined by an optometrist, and the near vision zone 3 is located at a certain standard position in the lens. It is thus appreciated that if the optometrist were provided inter alia with the measuring device 28 and a reference data representative of a plurality of maps of standard lenses manufactured by various producers, he would have prescribed a lens of an 'addition' higher than that defined by the patients eyesight for 'distance' and 'reading' visions. This would have resulted in the pupil location for 'reading' vision falling within that zone of the lens which has the required power value and is free of distortions. Indeed, it is understood that the power within the zone of continuous focus continuously increases from the power in the far vision zone to the power in the near vision zone. Hence, for a given point on the lens in proximity to the near vision zone, the more the 'addition' of the lens, the more the power value in that point.

Thus, the provision of the device 28 and, additionally, a reference data presenting various maps of standard lenses, enables the optometrist to choose the most suitable lens parameters, i.e. the optical power and the power and distortions distribution, for meeting the requirements of the patient's eyesight and the frame parameters, i.e. pupils' locations relative to the frame for 'distance' and 'reading' visions. In other words, the optometrist may choose the most suitable manufacturer of progressive lenses to make an order.

Figure 8:
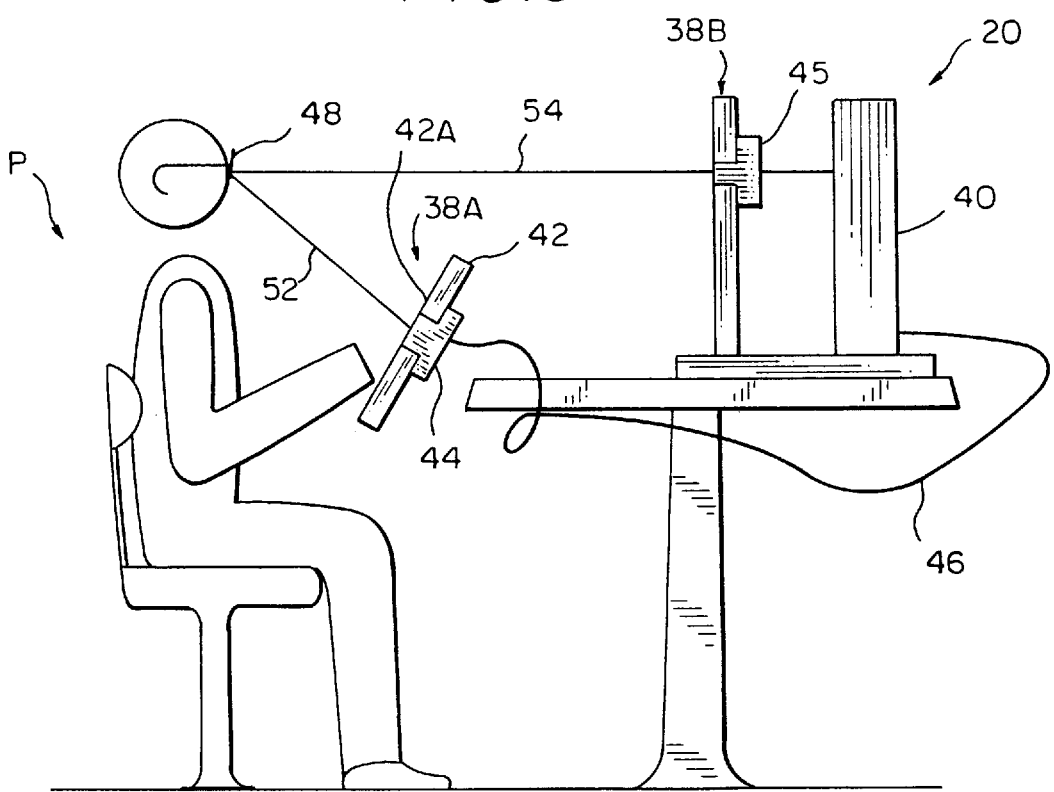
FIG. 8 is a pictorial illustration of a measuring device of the system of FIG. 5.

Reference is now made to FIG. 8 illustrating the main components of the measuring device 28. The device 28 comprises first and second reading units designated generally as 38a and 38b, respectively, and an image processor 40. The reading unit 38a includes a support member 42 having a front outer surface which constitutes a target plane 42a comprising a printed data thereon. The device 38a further includes a conventional CCD camera 44 which is mounted inside the support member 42 and connected to the image processor 40 through a wire 46 in a conventional manner. The reading unit 38b similarly comprises a support member 43 and a CCD camera 45 coupled to the image processor 40.

Thus, a patient P puts on an empty frame 48 of his/her future spectacles and starts to read the printed data holding the support member 42 in the most convenient position for him to read. To this end, the CCD camera 44 is preset so as to have the patient's eyes located within a length of focus of the CCD camera 44. The target plane 42a is formed of a transparent background, while the printed data and the background are of contrasted colors, for example black and white. It is thus understood that the printed data is in such a proximity to the CCD 44 that it never falls within the depth of focus of the CCD 44. Therefore, the CCD 44 is adapted to capture real pictures of the patients eyes disposed within the contours of the frame 48 during the real process of reading. Actually, such picture presents the patient's pupils locations, relative to the frame. The unit 38b operates in a similar manner in respect to the 'distance' vision for providing a real picture of the pupils' locations relative to the frame when the patient looks into the distance. Obviously, the inter pupillary distance for the 'distance' vision may be determined in any other conventional manner. Additionally, the CCD camera 45 of the unit 38b is capable of capturing a picture presenting a real location of the frame 48 relative to the patients face.

Figure 9:
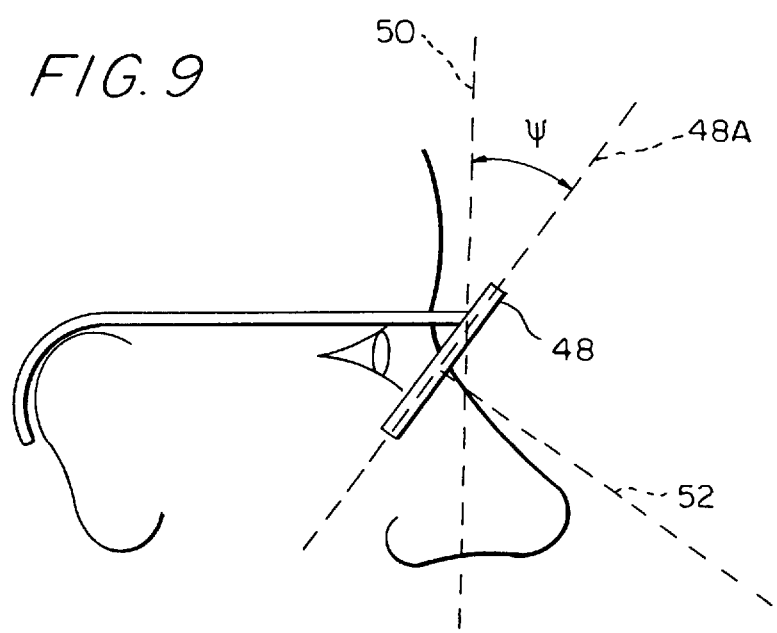
FIG. 9 more specifically illustrates the principles of operation of the measuring device of FIG. 8.

Turning now to FIG. 9, there is more specifically illustrated that the frame 48 defines a plane 48a which is not parallel to a plane 50 defined by the patient's face. The plate 48a is always inclined forward, i.e. away from the face plane 50 at a certain angle $\phi$. The angle $\phi$ depends on a profile of the patients face. The more the angle $\phi$, the more the probability that a line 52 of sight for 'reading' vision, as well as a line 54 of sight for 'distance' vision (FIG. 8) would not cross the frame's plane 48a within the zones 2 and 3 of the lens. This results in that, even when prescribing correct parameters of the lenses according to the patient's eyesight and inter pupillary distance, the final mounting of lenses in the frame would not be successful. To this end, either the patient P or the unit 38 is rotated at approximately 90° and the CCD camera 45 is operated for imaging a side view of the patient wearing the frame 48 so as to determine the angle $\phi$.

It thus becomes clear that for both 'distance' and 'reading' visions such parameters as pupils locations relative to the frame for each eye are very important and should, therefore, be considered either at the first stage of prescribing the lens parameters by an optometrist, or at the last stage of adjusting the lens for mounting into the frame.

In summary, a spectacle progressive lens is edged so that when the person is wearing the frame his or her natural reading line of sight (52) passes intersects the frame plane at a near-vision intersection point (34a, 34b), and the natural distant line of sight (54) intersects the frame plane at a far-vision intersection point (32a, 32b); and a center of the near-vision zone is located substantially at the nearvision intersection point, a center of the far-vision zone is located substantially at the far-vision intersection point, and a line connecting the center of the near-vision zone to the center of the far-vision zone lies entirely within the zone of continuous focus of the lens. The lens is moved in the plane of the frame via horizontal translation, vertical translation, and rotation of the lens.

Those skilled in the art will readily appreciate that various modifications and changes may be applied to the above described embodiments of the invention without departing from its scope defined in and by the appended claims.

What is claimed is:

1. A method of adjusting a progressive lens relative to the frame of a patient's spectacles, wherein the lens has power and distortions distributions defining far and near vision zones which are located in accordance with respective prescribed first and second values of an optical power required for the patient's eye at distance and reading modes respectively and are spaced from each other by a zone of continuous focus defined in accordance with addition of said lens, the method comprising the steps of:

(a) determination of a location of intersection of a line of sight of the patient's eye at said reading mode with a plane defined by the frame of the spectacles relative to said frame; and (b) positioning said progressive lens via at least one of a horizontal translation, a vertical translation, and a rotation of the lens relative to said frame so as to ensure that said location at said reading mode is positioned substantially in said near vision zone, and a line connecting said location with said far vision zone lies substantially within said zone of continuous focus.

2. The method according to claim 1, and also comprising the determination of the distributions of said optical power and of said optical distortions of the progressive lens.

3. The method according to claim 2, wherein the positioning of said progressive lens is such as to ensure that said location at reading mode lies in a region on the lens in which the optical power is substantially of said second value and the optical distortions are minimal.

4. The method according to claim 1, comprising determination of a location of intersection of a line of sight of the patient's eye at said distance mode with the plane defined by the frame of the spectacles, relative to said frame, said positioning of the progressive lens being such as to ensure that said location at the distance mode is positioned substantially in said far vision zone of said progressive lens, and a line connecting said location at the reading mode and said location at the distance mode lies substantially within said zone of continuous focus.

5. The method according to claim 4, and also comprising the determination of the distributions of said optical power and of said optical distortions of the progressive lens.

6. The method according to claim 5, wherein the positioning of said progressive lens is such as to ensure that said location at the distance mode lies in a region on the lens in which the optical power is substantially of said first value and the optical distortions are minimal.

7. The method according to claim 1, wherein said determination of said location at said reading mode is performed by means of the measurement of the pupils' location of the patient relative to the frame for the reading mode.

8. The method according to claim 1, wherein said measurement of the pupils' location of the patient for the reading mode is performed at a 10 natural reading position of the patient.

9. The method according to claims 2 wherein said determination of said power and distortions distributions comprises processing an image of the lens in a so-called 'mapping' system.

10. The method according to claim 2 wherein said determination of said power and distortions distributions comprises analyzing a reference data representative of a plurality of maps of standard lenses manufactured by various producers.

11. The method according to claim 1, wherein said positioning and orienting of the progressive lens relative to the frame are performed on an edger device in which there are provided linear and rotational movements of the lens.

12. The method according to claim 1, also comprising the step of:
upon detecting that the progressive lens cannot be oriented so as to position said location at the reading mode substantially in said near vision zone, and position said line connecting said location at the reading mode with said far vision zone substantially within said zone of the continuous focus, replacing said progressive lens by another progressive lens having an addition different from said addition of said progressive lens.

13. The method according to claim 1, wherein said positioning comprises displacement of the lens relative to the frame of the spectacles along two mutually perpendicular axes lying in the plane defined by the frame of the spectacles.

14. The method according to claim, 1, wherein said positioning comprises rotation of the lens in said plane defined by the frame of the spectacles.

15. A method of adjusting a progressive lens relative to the frame of a patient's spectacles, wherein the lens has distributions of an optical power and optical distortions therein defining far and near vision zones which are located in accordance with respective prescribed first and second values of the optical power required for the patient's eye at distance and reading modes, respectively, and are spaced from each other by a zone of continuous focus defined in accordance with addition of said lens, the method comprising the steps of:
determination of said distributions of optical power and optical distortions in said progressive lens;
determination of a location of intersection of a line of sight of the patient's eye for at least said reading mode with a plane defined by the frame of the spectacles, relative to said frame; and
positioning said progressive lens via at least one of a horizontal translation, a vertical translation, and a rotation of the lens relative to said frame so as to ensue that said location is positioned substantially in the near vision zone, and a line connecting said location at the reading mode with said far vision zone lies substantially within said zone of the continuous focus.

16. The method according to claim 15, wherein said determination of distributions of optical power and optical distortions comprises processing an image of the lens in a so-called 'mapping' system.

17. The method according to claim 15, wherein said determination of distributions of optical power and optical distortions comprises processing a reference data representative of a plurality of maps of standard lenses manufactured by various producers.

18. The method according to claim 15, also comprising the step of:
upon detecting that the progressive lens cannot be oriented so as to position said location at the reading mode substantially in said near vision zone, and position said line connecting said location at the reading mode with said far vision zone substantially within said zone of the continuous focus, replacing said progressive lens by another progressive lens having an addition different from said addition of said progressive lens.

19. The method according claim 15, wherein said positioning comprises displacement of the lens relative to the frame of the spectacles along two mutually perpendicular axes lying in the plane defined by the frame of the spectacles.

20. The method according to claim 15, wherein said positioning comprises rotation of the lens in said plane defined by the frame of the spectacles.

21. A system for adjusting a progressive lens relative to a frame of a patient's spectacles, the lens having distributions of an optical power and optical distortions therein defining far and near vision zones which are located in accordance with respective prescribed first and second values of the optical power required for the patient's eye at distance and reading modes, respectively, and are spaced from each other by a zone of continuous focus defined in accordance with addition of said lens, the system comprising:
(i) a device for the determination of a location of intersection of a line of sight of the patient's eye at said reading mode with a plane defined by the frame of the spectacles, relative to said frame; and
(ii) a device for positioning of said progressive lens relative to said frame so as to ensure that said location at the reading mode is positioned substantially in said near vision zone, and a line connecting said location at the reading- mode with said far vision zone lies substantially within said zone of the continuous focus.

22. The system according to claim 21, and also comprising means for determination of the distributions of said optical power and of said optical distortions of the progressive lens.

23. The system according to claim 22, wherein said device for positioning of said progressive lens relative to said frame operates such as to ensure that said location at the reading mode lies in a region of the lens in which the optical power is substantially of said second value and in which said optical distortions are minimal.

24. The system according to claim 21, and also comprising means for determination of a location of intersection of a line of sight of the patient's eye at said distance mode with the plane defined by the frame of the spectacles, relative to said frame, said positioning of the progressive lens being such as to ensure that said location at the distance mode is positioned substantially in said far vision zone, and a line connecting said location at the distance mode with said location at the reading mode lies substantially within said zone of the continuous focus.

25. The system according to claim 24, and also comprising means for determination the distribution of said optical power and of said optical distortions of the progressive lens.

26. The system according to claim 25, wherein the device for positioning of said progressive lens operates such as to ensure that said location at the distance mode lies in a region of the lens in which the optical power is substantially of said first value and the optical distortions are minimal.

27. The system according to claim 21 wherein said device for the determination of said location at said reading mode measures the pupils' location of the patient for the reading mode, at a natural reading position of the patient.

28. The system according to claim 21, and also comprising a mapping device for the determination of the distributions of said optical power and of said optical distortions of said progressive lens.

29. The system according to claim 21, and also comprising a storing means for storing a reference data representative of a plurality of maps of standard lenses manufactured by various producers.

30. The system according to claim 21, being in the form of an edger device enabling linear and rotational movements of said progressive lens.

31. The system according to claim 21, and also comprising a processor unit.

32. The system according to claim 27, wherein said device for the determination of said location at the reading mode comprises a transparent target plane having a material to read, and at least one optical camera associated with the target plane, and at least one optical camera associated with the target plane, wherein the camera is adapted for such a disposition that the patient's eyes are located in a focal plane of the camera, and said target plane is disposed between said optical camera and said focal plane so as to enable said optical camera to provide an image of pupils of the patients' eyes in said frame.

33. The system according to claim 32, also comprising an additional camera for providing an image of a side view of the patient's face with the frame of the spectacles thereon.

34. The system according to claim 33, wherein said additional camera is adapted to provide an image of pupils of the patient's eyes in said frame when disposed for distance mode.

35. A system for adjusting a progressive lens relative to a frame of a patient's spectacles, wherein the lens has distributions of an optical power and distortions therein defining far and near vision zones which are located in accordance with respective prescribed first and second values of the optical power required for the patient's eye at distance and reading vision, respectively, and are spaced from each other by a zone of continuous focus defined in accordance with addition of the lens, the system comprising:

a mapping device for the determination of the distributions of said optical power and of said optical distortions of said progressive lens; a means for determination of a location of intersection of a line of sight of the patient's eye for at least said reading mode with a plane defined by the frame of the spectacles, relative to said frame; and a device for positioning of said progressive lens via at least one of a horizontal translation, a vertical translation, and a rotation of the lens relative to said frame so as to ensure that said location at the reading mode is positioned substantially in said near vision zone, and a line connecting said location at the reading mode with said far vision zone lies substantially with said zone of the continuous focus.

36. The system according to claim 35, wherein said means for determination of said location for at least said reading mode comprises a transparent target plane and at least one optical camera associated with the target plane, wherein the camera is adapted for such a disposition that the patient's eyes are located in a focal plane of the camera, and said target plane is disposed between said optical camera and said focal plane so as to enable said optical camera to provide an image of pupils of the patients' eyes in said frame.

37. The system according to claim 36, also comprising an additional camera for providing an image of a side view of the patient's face with the frame of the spectacles thereon.

38. The system according to claim 37, wherein said additional camera is adapted to provide an image of pupils of the patient's eyes in said frame when disposed for distance mode.

39. A method of edging a spectacle progressive lens to fit into a contour frame opening (10*a*, 10*b*) of a spectacle frame to be worn by a person, the frame opening generally defining a frame plane;

(a) wherein a person wearing the frame has a natural reading line of sight (52) which passes through the frame opening and intersects the frame plane at a near-vision intersection point (34*a*, 34*b*), and the person wearing the frame has a natural distant line of sight (54) which passes through the frame opening and intersects the frame plane at a far-vision intersection point (32*a*, 32*b*);

(b) the spectacle lens including a near-vision zone (3*a*, 3*b*), a far-vision zone (2*a*, 2*b*), and a zone of continuous focus (4*a*) therebetween;

the method comprising:
 edging the lens such that, when the lens is mounted in the frame opening, (c) a center of the near-vision zone is located substantially at the near-vision intersection point, (d) a center of the far-vision zone is located substantially at the far-vision intersection point, and (e) a line connecting the center of the near-vision zone to the center of the far-vision zone lies entirely within the zone of continuous focus of the lens.

40. The method according to claim 39, including a step of determining the near-vision intersection point and the far-vision intersection point while the spectacle frame is worn by the person.

* * * * *